Nov. 23, 1926.

W. R. SPAULDING 1,607,704

DETACHABLE AWNING FOR CLOSED BODY AUTOMOBILES

Filed July 6, 1926      2 Sheets-Sheet 1

Inventor

WILLIAM R. SPAULDING,

By Shepherd Campbell

Attorneys

Nov. 23, 1926. 1,607,704
W. R. SPAULDING
DETACHABLE AWNING FOR CLOSED BODY AUTOMOBILES
Filed July 6, 1926 2 Sheets-Sheet 2
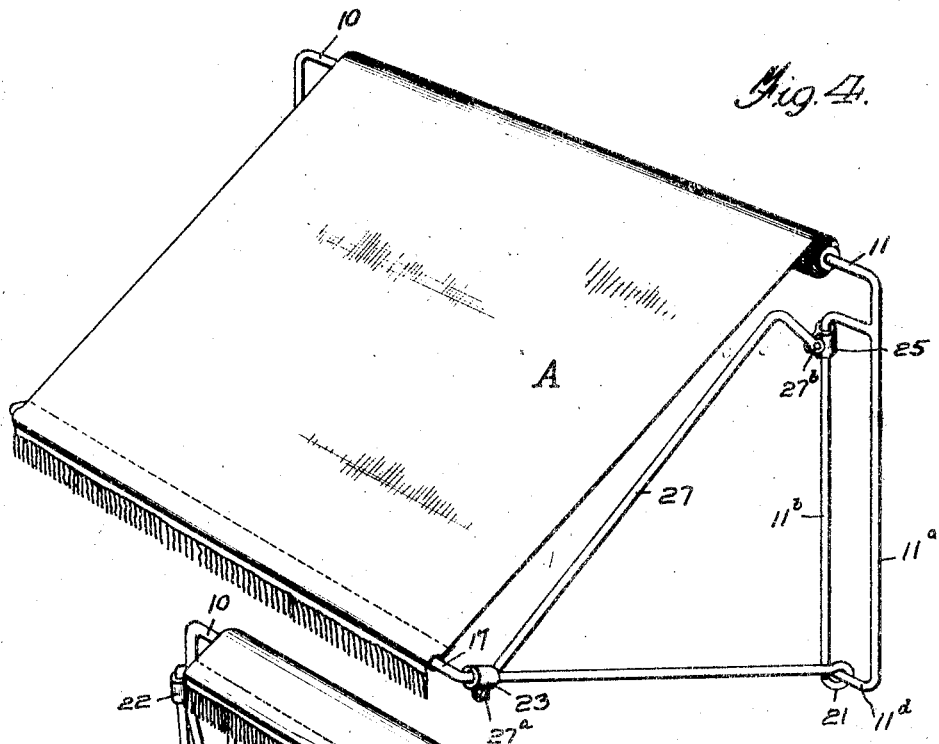
Fig. 4.
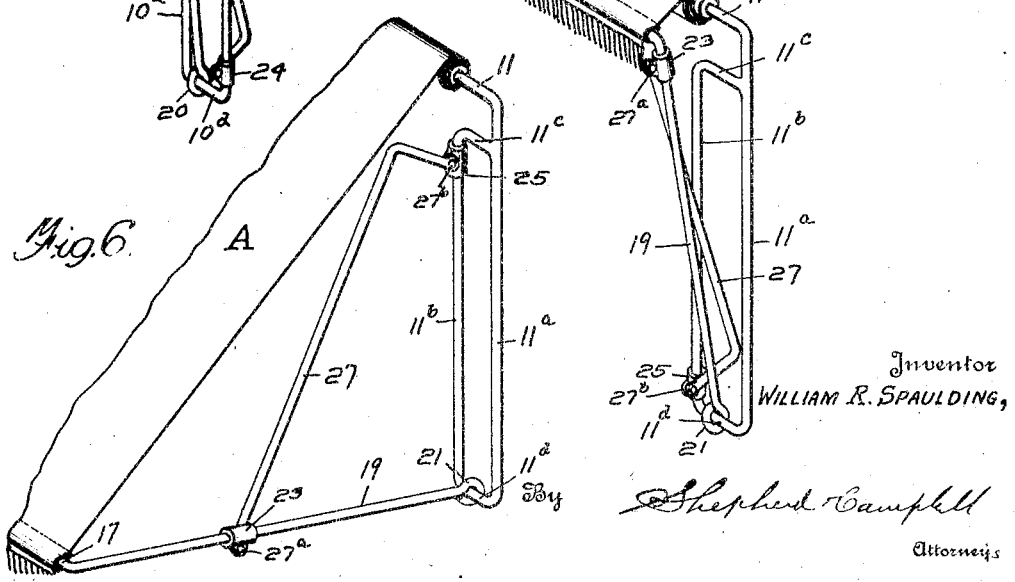
Fig. 5.
Fig. 6.
Inventor
WILLIAM R. SPAULDING,
By Shepherd Campbell
Attorneys Patented Nov. 23, 1926.

1,607,704

UNITED STATES PATENT OFFICE.

WILLIAM RUSSELL SPAULDING, OF INDEPENDENCE, KANSAS, ASSIGNOR TO ARTHUR M. BEAMISH, OF INDEPENDENCE, KANSAS.

DETACHABLE AWNING FOR CLOSED-BODY AUTOMOBILES.

Application filed July 6, 1926. Serial No. 120,730.

This invention relates to awnings for the side windows of closed body automobiles, of the character of that shown in my copending application Serial No. 79,842, filed on January 7, 1926.

The object of the present invention is to provide improved means for holding the awning in its adjusted position. Under the improved structure of the present invention, I am able to hold the awnings securely in varying positions of adjustment as well as in a lower position than is possible with the structure of my application aforesaid. The means by which these desirable results are secured will be more particularly described in the detailed description which follows.

In the accompanying drawings

Fig. 4 is a perspective view of the awning in its opened or lowered position.

Fig. 5 is a perspective view of the awning in closed position and

Fig. 6 is a fragmentary perspective view showing the brace in an intermediate position.

Like numerals designate corresponding parts in all of the figures of the drawings.

Figure 1:
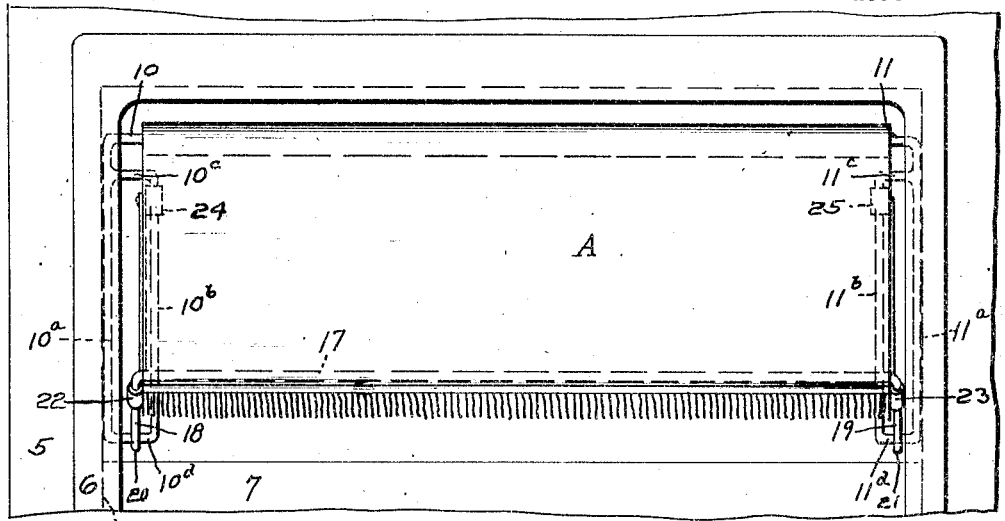
Fig. 1 is an elevation of a portion of an automobile door having the awning applied thereto.
Figure 2:
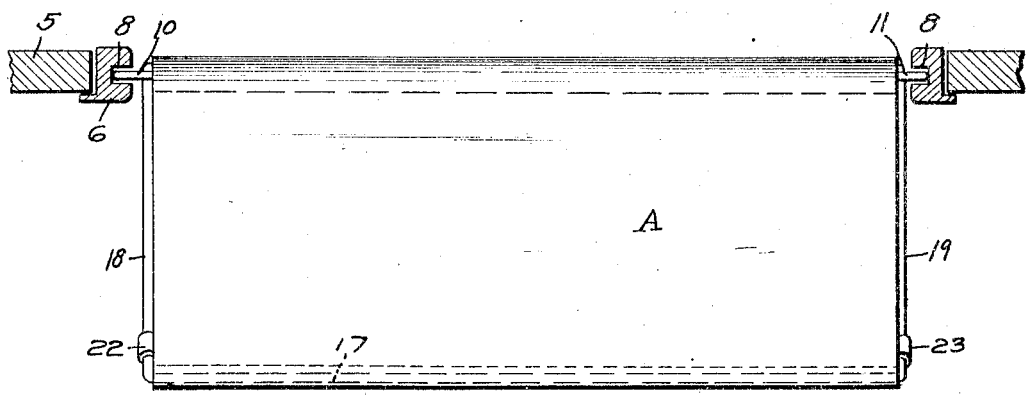
Fig. 2 is a horizontal sectional view through said door with the awning in place.

Referring now to the drawings, 5 designates a part of an automobile body, 6 the frame of the door thereof and 7, the usual, vertically sliding glass of the upper portion of the door. This glass 7, slides in vertical grooves 8, of the frame of the door and, with the glass lowered, I utilize these grooves to receive the frame of the awning of my invention.

Figure 3:
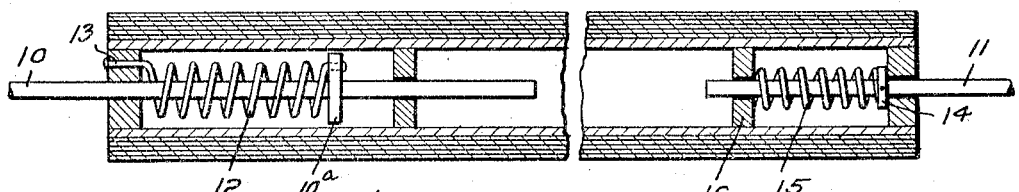
Fig. 3 is a horizontal sectional view through a spring wound roller hereinafter described.

The awning web A is wound upon a roller, said roller being mounted to turn upon two horizontally disposed stub shaft sections 10 and 11. The stub shaft section 10 (see Fig. 3) carries a collar $10^a$, to which one end of a spring 12, is attached. The other end of this spring is secured at 13 to an end wall of the roller. When the awning web A, is drawn from the roller this spring is placed under tension. Thus, the roller constantly tends to wind the awning thereon. The shaft section 11, is provided with a collar 14, and a compression spring 15, bears between this collar and a web 16 which spans the interior of the roller. Thus the stub shaft section 11 may be thrust inwardly with respect to the roller for a purpose hereinafter described.

The outer ends of the stub shaft sections carry vertical frames comprising outer vertical bars $10^a$, $11^a$, inner vertical bars $10^b$ and $11^b$; the upper horizontal connecting portions $10^c$ and $11^c$, and the lower horizontal connecting portions $10^d$ and $11^d$. It is manifest that the yielding connection provided by the spring 15 renders it possible to move these rigid frame members toward each other enough to permit the location of the bars $10^a$, $11^a$, in alignment with the glass grooves 8, and that when these frame members are released said spring will act to cause them to move apart and thereby firmly engage bars $10^a$ in said grooves. It is further apparent that when so inserted in the grooves they may be slid bodily up or down as may be desired, in order to most effectually shield the occupants of the automobile from the sun, rain, etc. The main run 17 of a U-shaped spreader is engaged with the free edge of the awning and the legs 18 and 19 of said spreader, are hingedly connected by the eyes 20 and 21, with the horizontal portions $10^d$, $11^d$ of the vertical frame.

The structure so far described is substantially like that of my application aforesaid. Under the present invention I provide sleeves 22 and 23 which are slidable along the legs 18 and 19 of the spreader and I provide sleeves 24 and 25 which are vertically slidable upon the inner bars $10^b$ and $11^b$ of the frames and I pivotally connect the ends of angular braces 26 and 27 to said sleeves as indicated at $27^a$ and $27^b$. With the awning in the closed position of Fig. 5, the pull of the spring wound roller tends to keep the awning in said closed position, to hold the parts tightly together and to prevent undesirable rattling of the same. When the awning is to be moved to open or protective position the spreader is swung outwardly and downwardly and the sleeves 23 are slipped upwardly upon the bars $10^b$, $11^b$. At the beginning of this opening movement the pull of the spring actuated awning tends to move these sleeves downwardly. After they have been moved upwardly a certain distance they move to a "past center" position. That is, the pull of the awning tends to move them upwardly or to the top of the vertical bars 10<sup>b</sup>, 11<sup>b</sup>. Thus when moved to this latter position it is assured that the awning will be securely held without undesirable rattling in its open position. Thereafter the sleeves 22 and 23 may be slipped inwardly along the legs 18 and 19 of the spreader to open or lower the awning even more than is possible with the braces in the position illustrated in Fig. 4, and by virtue of the angular shape of the braces and their manner of attachment to the depending ears of the sleeves 22 and 23, said sleeves will remain in the position illustrated in Fig. 6 and thus hold the awning in extreme lowered position.

It is to be understood that the invention is not limited to the precise construction set forth but that it includes within its purview whatever changes fairly come within either the terms or the spirit of the appended claims.

Having described my invention what I claim is:

1. A structure of the character described comprising a spring wound roller, an awning web thereon, a mounting for said roller comprising a pair of vertical frames adapted to engage in the glass grooves of an automobile door, a spreader the legs of which are hinged for vertical swinging movement upon said frames, sleeves slidable upon said spreader and upon the vertical frames respectively, and braces, the opposite ends of which are pivotally connected to said sleeves, said braces moving to past center position during the movement of the awning to open position where they are held by the tension exerted upon the awning web by the spring roller.

2. A structure as recited in claim 1 wherein said braces are of angular formation.

3. A structure of the character described comprising a spring actuated roller, an awning web thereon, a mounting for said roller comprising a pair of vertically disposed frames movable toward and from each other and comprising inner vertical members and outer vertical members, the outer vertical members being adapted to engage in the glass grooves of an automobile door, spring means tending to move said frames apart, a U-shaped spreader with which the lower edge of the awning is engaged, the legs of said spreader being hingedly connected to the lower portions of said frame, sleeves slidably mounted upon the inner vertical members of the frame, sleeves slidably mounted upon the legs of the spreader and angular braces pivotally connected to projecting ears of said sleeves and movable to past center position where they are held under the tension exerted through the awning web by the spring roller.

In testimony whereof I affix my signature.

WILLIAM R. SPAULDING.